US006879499B2

(12) United States Patent
Matsumoto (10) Patent No.: US 6,879,499 B2
(45) Date of Patent: Apr. 12, 2005

(54) DC-DC CONVERTER (75) Inventor: Tadahiko Matsumoto, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 6 days.

(21) Appl. No.: 10/696,403

(22) Filed: Oct. 28, 2003

(65) Prior Publication Data

US 2004/0090799 A1 May 13, 2004

(30) Foreign Application Priority Data

Nov. 7, 2002 (JP) .......................................... 2002-323489
Aug. 28, 2003 (JP) .......................................... 2003-304922

(51) Int. Cl.⁷ .............................................. H02M 3/335
(52) U.S. Cl. .................................. 363/21.06; 363/21.08
(58) Field of Search ........................... 363/21.04, 21.06, 363/21.08

(56) References Cited

U.S. PATENT DOCUMENTS 5,726,869 A * 3/1998 Yamashita et al. ........ 363/21.06
5,742,491 A * 4/1998 Bowman et al. .......... 363/21.06

FOREIGN PATENT DOCUMENTS

| JP | 04-127869 | 4/1992 |
| JP | 10-174431 | 6/1998 |
| JP | 11-206118 | 7/1999 |
| JP | 2000-260639 | 9/2000 |
| JP | 2000-262051 | 9/2000 |
| JP | 2002-247848 | 8/2002 |
| JP | 2002-247849 | 8/2002 |

* cited by examiner

*Primary Examiner*—Shawn Riley
(74) *Attorney, Agent, or Firm*—Keating & Bennett, LLP (57) ABSTRACT

A DC-DC converter includes an ON-timing delay circuit in which, when an ON signal is output from a power switch driving circuit in a control IC to a power switch, the ON timing of the power switch is delayed by hindering the start of the ON operation of the power switch. An early turnoff circuit is provided in which, during delay of the ON timing of the power switch, a commutating synchronous rectifier has an ON and OFF switching operation that is inverse with respect to that of the power switch. A delay eliminating circuit is provided which promptly stops the delay operation of the ON-timing delay circuit when detecting the turnoff of the commutating synchronous rectifier which is caused by a drop in the gate of a commutating synchronous rectifier. When the delay operation of the ON-timing delay circuit continues after the turnoff the commutating synchronous rectifier, a loss caused by the continuation of the delay operation occurs. The problem can be prevented by the delay eliminating circuit.

19 Claims, 7 Drawing Sheets

DC-DC CONVERTER

BACKGROUND OF THE INVENTION

1. Field of the Invention

The present invention relates to an insulating DC-DC converter including a synchronous rectifier.

2. Description of the Related Art

Figure 6:
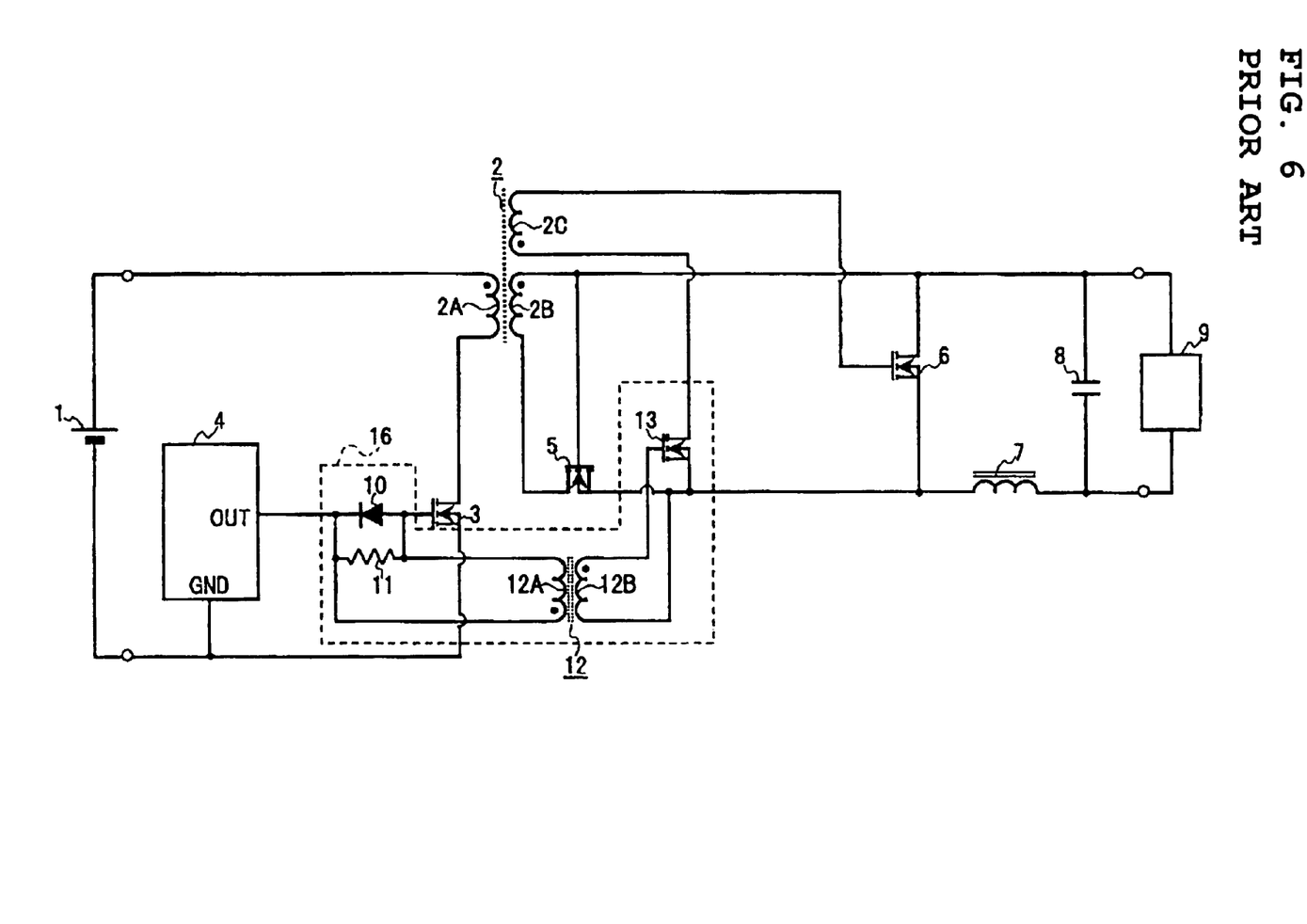
FIG. 6 is a circuit diagram showing an example of a DC-DC converter of the related art.
Figure 7:
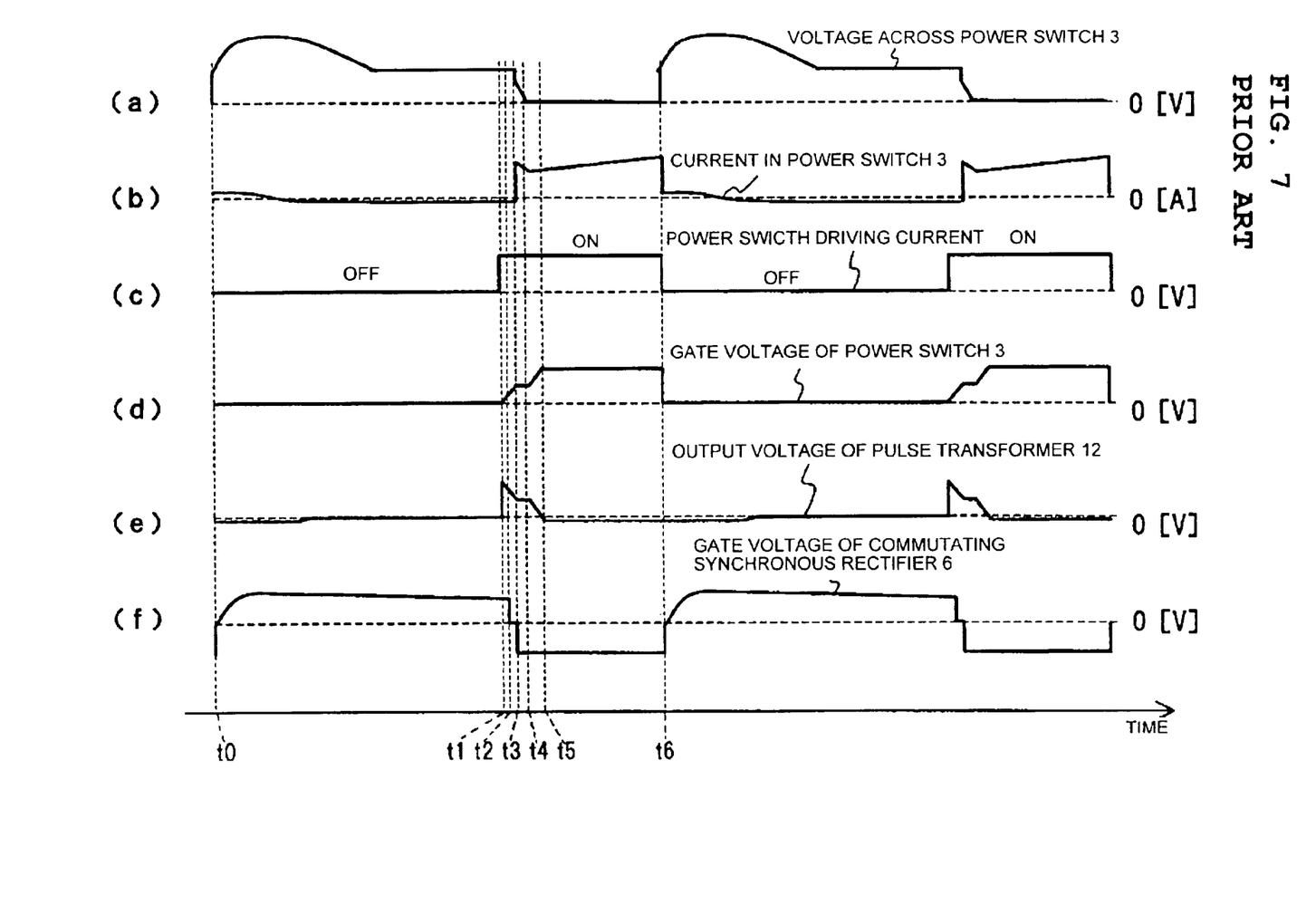
FIG. 7 is a waveform chart showing examples of waveforms in main circuit components of the DC-DC converter shown in FIG. 6.

An example of a DC-DC converter is shown in the schematic circuit diagram in FIG. 6, and examples of schematic operating waveforms are shown in FIG. 7. Here, a forward converter is described as an example. This circuit is disclosed in Japanese Unexamined Patent Application Publication No. 2000-262051.

The DC-DC converter in FIG. 6 includes a main transformer 2, a power switch 3 (N-channel metal-oxide semiconductor field-effect transistor (MOSFET)), a control IC 4, a rectifying synchronous rectifier 5 (N-channel MOSFET), a commutating synchronous rectifier 6 (N-channel MOSFET), a choke coil 7, a capacitor 8, and an early turnoff circuit 16.

The main transformer 2 includes a primary coil 2A, a secondary coil 2B, and an auxiliary coil 2C. The control IC 4 has a power switch driving circuit (not shown) therein, an output terminal OUT for outputting a power switch driving signal generated in the power switch driving switch, and a ground terminal GND. The early turnoff circuit 16 includes a diode 10, a resistor 11, a pulse transformer 12, and an N-channel MOSFET 13. The pulse transformer 12 includes a primary coil 12A and a secondary coil 12B.

Next, an example of the operation of the DC-DC converter is described by using the operating waveforms in FIG. 7. At first, the power converting operation of the DC-DC DC converter is described. For example, the power switch driving signal having a pulse waveform as shown in part (c) of FIG. 7 is output from the power switch driving circuit of the control IC 4 to the gate of the power switch 3. Based on ON/OFF signals and OFF signals in the power switch driving signal, the power switch 3 performs an ON/OFF switching operation. A DC voltage input from an external DC input power supply 1 is converted by the switching of the power switch 3 into an AC voltage in the primary coil 2A of the main transformer 2, and is transmitted to the secondary coil 2F of the main transformer 2.

The synchronous rectifiers 5 and 6 on the side of the secondary coil 2B constitute a rectifying-and-smoothing circuit. In this rectifying-and-smoothing circuit, the AC voltage output from the secondary coil 2B of the main transformer 2 is rectified by the switching operations of the rectifying synchronous rectifier 5 and the commutating synchronous rectifier 6, which are described later, and is smoothed and converted into a DC voltage by the choke coil 7 and the capacitor 8. The DC voltage is supplied to an external load device 9 connected to the DC-DC converter. A signal in accordance with the output voltage is transmitted as a feedback signal to the signal input/output device 4 by a feedback loop (not shown). Based on the feedback signal, the power switch driving circuit of the control IC 4 controls the switching operation of the power switch 3, whereby the DC voltage supplied to the load device 9 is stabilized.

The rectifying synchronous rectifier 5 is turned on to be driven by a voltage generated in the ON period of the power switch 3 by the secondary coil 2B of the main transformer 2, and is turned off in the OFF period of the power switch 3. In other words, the rectifying synchronous rectifier 5 performs a switching operation with timing approximately synchronized with the turn-on and turnoff of the power switch 3.

Conversely, the commutating synchronous rectifier 6 is turned on by a reset pulse voltage in the secondary coil 2B of the main transformer 2 in the OFF period of the power switch 3, and is turned off in the OFF period of the power switch 3. The commutating synchronous rectifier 6 is an inversely driven synchronous rectifier whose ON/OFF switching operation is inverse with respect to that of the power switch 3.

In the example of the circuit in FIG. 6, before the power switch 3 is turned on, the commutating synchronous rectifier 6 can be turned off by the operations of the early turnoff circuit 16 and an ON-timing delay circuit (described later).

Next, an example of the operation of the early turnoff circuit 16 is described below.

As shown in part (c) of FIG. 7, when an ON signal for turning on the power switch 3 is output from the power switch driving circuit in the control circuit 4 at time t1, the ON signal applies a voltage to a series circuit of the primary coil 12A of the pulse transformer 12 and the gate (control terminal) of the power switch 3. Since the gate voltage of the power switch 3 is zero volts at time t1, a voltage output from the power switch driving circuit is entirely applied to the primary coil 12A of the pulse transformer 12. This causes the secondary coil 12B of the pulse transformer 12 to output a pulse signal as shown in part (e) of FIG. 7.

The pulse signal output from the secondary coil 12B is supplied to the gate (control terminal) of the N-channel MOSFET 13 and turns on the N-channel MOSFET 13. When the N-channel MOSFET 13 is turned on, as part (f) of FIG. 7 shows, at time t2, charge stored in the gate of the commutating synchronous rectifier 6 discharges to turn on the commutating synchronous rectifier 6.

Conversely, regarding the power switch 3, when the control IC 4 initiates outputting of an ON signal to the power switch 3 at time t1, the ON signal is supplied to the gate of the power switch 3 through the resistor 11 and the pulse transformer 12, and charge is added to the input capacitance of the power switch 3. Since the resistor 11 and the excitation inductance of the pulse transformer 12 operate as a delay factor, the power switch 3 has a gradual increase in gate voltage. When the gate voltage of the power switch 3 reaches a threshold value (time t3), the power switch 3 is turned on. A delay in the ON timing of the power switch 3 is set so that the ON timing of the power switch 3 is behind the turnoff of the commutating synchronous rectifier 6 by the early turnoff circuit 16, and the resistance of the conductive cover 11 and the excitation inductance of the pulse transformer 12 are set so that the delay is obtained. In other words, the resistor 11 and the pulse transformer 12 constitute an ON-timing delay circuit for delaying ON timing of the power switch 3.

After the power switch 3 is turned on (time t3), the voltage (drain-source voltage) across the power switch 3 starts to decrease, as shown in part (a) of FIG. 7. During the decease, the gate voltage of the power switch 3 is maintained to the threshold value by a mirror effect (see the period of time t3 to t4 in part (d) of FIG. 7). When the voltage across the power switch 3 reaches zero volts (time t4), the influence of the mirror effect turns off, thus restarting the gate voltage of the power switch 3. When the gate voltage of the power switch 3 reaches a power supply voltage of the control IC 4 (timing t5), the output of the pulse voltage from the pulse transformer 12 stops (see part (e) of FIG. 7).

When the output of the pulse voltage stops, a cyclic current flows in a path having a flowing order of the pulse transformer 12, the diode 10, and the pulse transformer 12, and a forward voltage drop in the diode 10 resets the exciting state of the pulse transformer 12. After an OFF signal for turning off the power switch 3 is output from the power switch driving switch in the control IC 4 (see part (c) of FIG. 7), the storage charge in the input capacitance of the power switch 3 discharges through the diode 10, thus turning off the power switch 3.

As described above, by setting a delay period from the time that the operations of the early turnoff circuit 16 and the ON-timing delay circuit cause the control IC 4 to output the ON signal to the power switch 3, to the time that the power switch 3 is turned on, and turning off the commutating synchronous rectifier 6 in the delay period, a short-circuiting current can be prevented from being generated by a delay in the turnoff of the commutating synchronous rectifier 6.

In addition to Japanese Unexamined Patent Application Publication No. 2000-262051, other examples of the related art are disclosed in Japanese Unexamined Patent Application Publication Nos. 10-174431, 11-206118, 2002-247848, 2002-247849, and 4-127869.

In the DC-DC converter in FIG. 6, the pulse signal output from the pulse transformer 12 has a fixed pulse width. In other words, the length of the delay operation period of the ON-timing delay circuit is fixed. Also, variations in component characteristics cause variations in turnoff timing of the commutating synchronous rectifier 6. When the variations in turnoff timing of the commutating synchronous rectifier 6 delay turnoff of the commutating synchronous rectifier 6, thus causing the power switch 3 to be turned on before the commutating synchronous rectifier 6 is turned off, a problem occurs in that a short-circuiting current is generated. Accordingly, in order to prevent the generation of the short-circuiting current even in a case in which turnoff timing of the commutating synchronous rectifier 6 is delayed, a delay in ON timing of the power switch 3 must be set to be large.

Nevertheless, when the delay in ON timing of the power switch 3 is excessive, a problem occurs in that an involved loss is generated. Specifically, in the circuit in FIG. 6, despite completion of turnoff of the commutating synchronous rectifier 6 at time t2, the delay operation of the ON-timing delay circuit continues to time t5. Accordingly, since charging to the input capacitance of the power switch 3 remains unchanged, there is a problem of an increase in switching loss caused by overlapping (see portion of timing t3 to t4 in parts (a) and (b) of FIG. 7) between the voltage across the power switch 3 and its current during the turn-on operation period of the power switch 3.

SUMMARY OF THE INVENTION

In order to overcome the problems described above, preferred embodiments of the present invention provide an insulating DC-DC converter using a synchronous rectifier that greatly improves efficiency.

According to a preferred embodiment of the present invention, a DC-DC converter includes a transformer having a primary side and a secondary side, at least one power switch provided on the primary side of the transformer, a switching operation of the at least one power switch causing the secondary side of the transformer to output AC power, a rectifying-and-smoothing circuit connected to the secondary side of the transformer and converting the output AC power into DC power, the rectifying-and-smoothing circuit including an inversely driven synchronous rectifier including a MOSFET having an ON/OFF switching operation that is inverse with respect to that of the at least one power switch, a power switch driving circuit for alternately outputting an ON signal and an OFF signal to the at least one power switch in order to control a switching operation of the at least one power switch, an ON-timing delay circuit for detecting output of the ON signal from the power switch driving circuit to the at least one power switch and delaying ON timing of the at least one power switch by hindering the start of an ON operation of the at least one power switch based on the ON signal, an early turnoff circuit for turning off the inversely driven synchronous rectifier by outputting an OFF signal to the inversely driven synchronous rectifier on detecting output of the ON signal from the power switch driving circuit to the at least one power switch, in a period in which the start of the ON operation of the at least one power switch is delayed by the ON-timing delay circuit, and a delay eliminating circuit for eliminating a delay operation of the ON-timing delay circuit when detecting turnoff of the synchronous rectifier by detecting a decrease in the gate voltage of the inversely driven synchronous rectifier.

According to a preferred embodiment of the present invention, during a delay operation of an ON-timing delay circuit, an inversely driven synchronous rectifier has an ON and OFF switching operation that is reverse with respect to that of a power switch. Thus, a short-circuiting current can be prevented from being generated by a delay in turnoff of the inversely driven synchronous rectifier. Also, in a preferred embodiment of the present invention, since a delay eliminating circuit is provided, when the gate voltage of the reversely driven synchronous rectifier decreases and the reversely driven synchronous rectifier is turned off, the delay eliminating circuit promptly eliminates the delay operation of the ON-timing delay circuit. Therefore, the delay operation of the ON-timing delay circuit is unnecessarily continued despite a state in which the inversely driven synchronous rectifier is turned off, thus suppressing a loss caused by an excess amount of a delay operation period. This can achieve improvements in the efficiency characteristic. In addition, since the delay eliminating circuit is realized by a simplified circuit configuration, an increase in the number of components can be prevented.

Also, by providing the ON-timing delay circuit on a signal path extending to the power switch from the power switch driving circuit, an advantage can be obtained in that components having small power capacity can constitute the ON-timing delay circuit.

The early turnoff circuit preferably uses a pulse transformer for transmitting, from the primary side to secondary side of the transformer, a signal representing output of the ON signal from the power switch driving circuit to the power switch, whereby an advantage can be obtained in that a transformer having an excitation inductance that is smaller than that of a common drive transformer may be used.

Also, by configuring the ON-timing delay circuit to delay the ON timing of the power switch by using the excitation inductance of the pulse transformer of the early turnoff circuit, the pulse transformer functions as one of the components of the early turnoff circuit and functions as one of the components of the ON-timing delay circuit. Thus, a reduced number of components can constitute the circuits.

In addition, by providing a power-switch-on inducement circuit, the power-switch-on inducement circuit can greatly shorten a period from elimination of the delay operation of the ON-timing delay circuit by the delay eliminating circuit until completion of the turn-on operation of the power switch.

Moreover, by providing a delay adjustment circuit in the ON-timing delay circuit, the delay adjustment circuit can adjust delay-operation-terminating timing. Thus, variation in the delay-operation-terminating timing of the ON-timing delay circuit, which is caused by variation in components, etc., can be reduced, thus ensuring prevention of a problem in that the delay operation of the ON-timing delay circuit terminates before the inversely driven synchronous rectifier is turned off.

Other features, elements, characteristics and advantages of the present invention will become more apparent form the following detailed description of preferred embodiments with reference to the attached drawings.

DETAILED DESCRIPTION OF PREFERRED EMBODIMENTS

Preferred embodiments of the present invention are described below with reference to the accompanying drawings.

Figure 1:
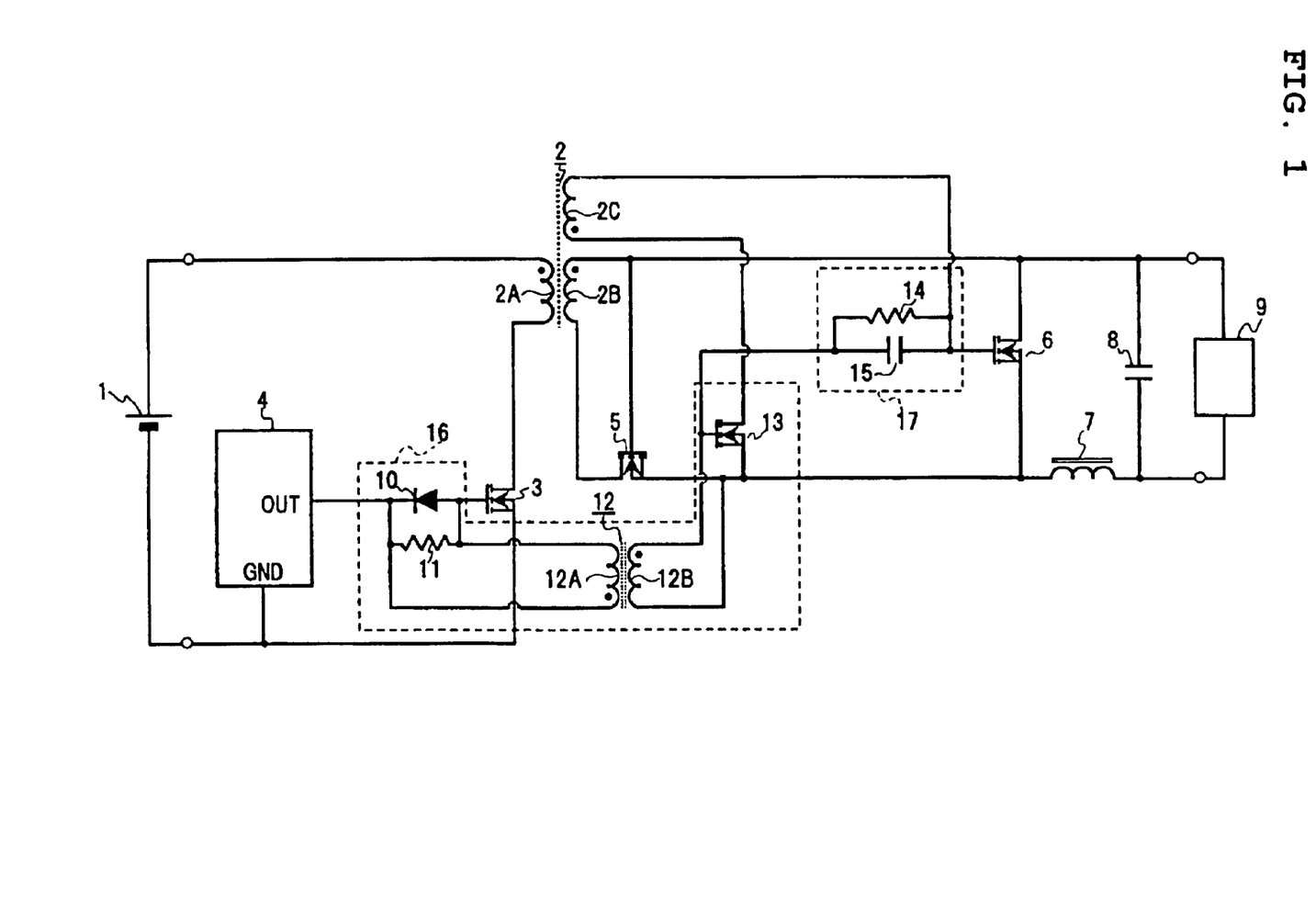
FIG. 1 is a circuit diagram showing a DC-DC converter according to a preferred embodiment of the present invention.
Figure 2:
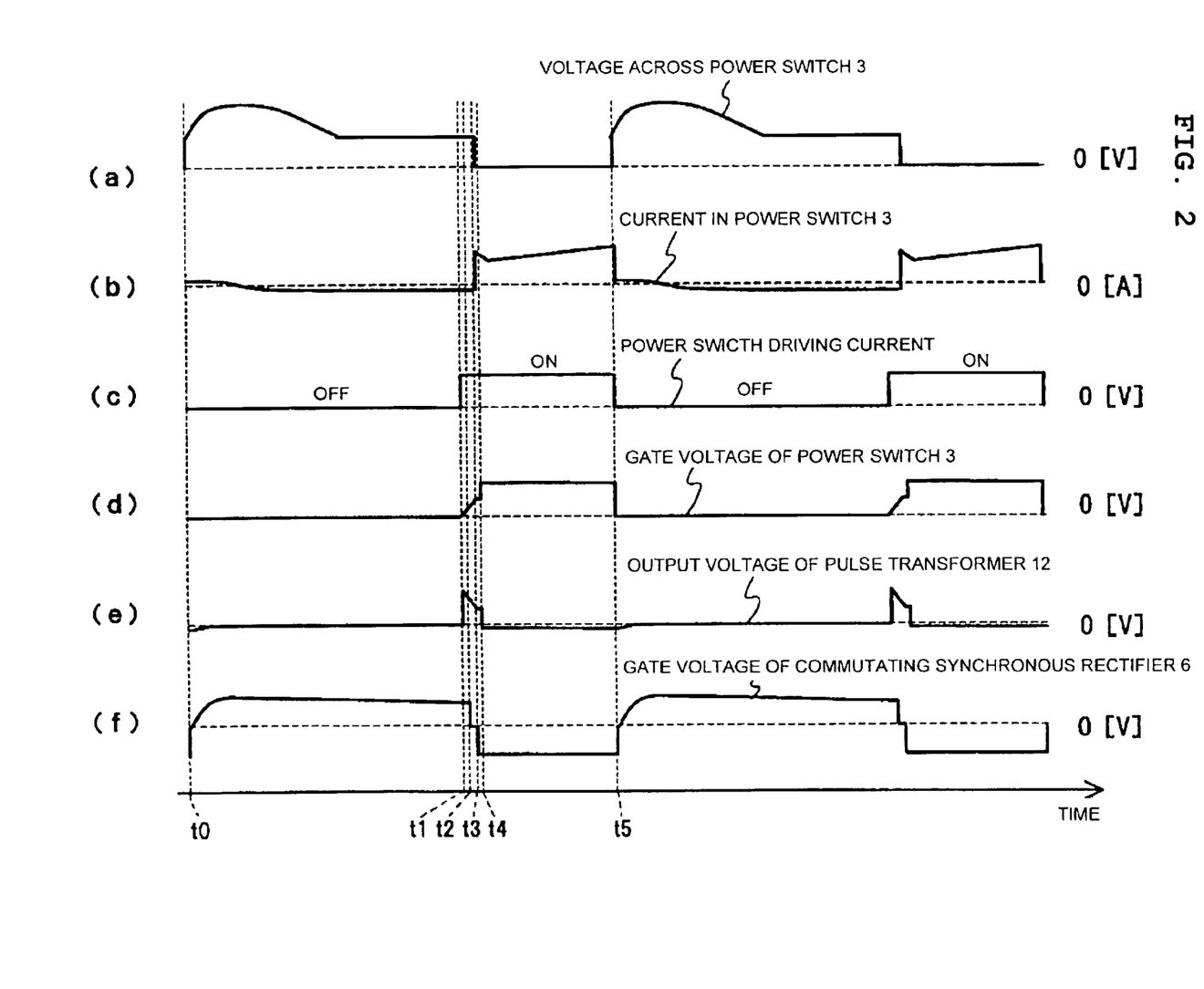
FIG. 2 is a waveform chart showing examples of operating waveforms in main circuit components in the DC-DC converter according to a preferred embodiment of the present invention.

The configuration of a DC-DC converter according to a preferred embodiment of the present invention is shown in FIG. 1, and schematic examples of waveforms in the circuit are shown in FIG. 2. Here, a forward converter is described as an example.

As shown in FIG. 1, the DC-DC converter according to a first preferred embodiment preferably includes a main transformer 2, a power switch element 3 (N-channel MOSFET), a control IC 4, a rectifying synchronous rectifier 5 (N-channel MOSFET), a commutating synchronous rectifier 6 (N-channel MOSFET), a choke coil 7, a capacitor 8, an early turnoff circuit 16, and a delay eliminating circuit 17.

The delay eliminating circuit 17 preferably includes a resistor 14 and a capacitor 15.

In this preferred embodiment, a signal path connecting the gate of the commutating synchronous rectifier 6 and the gate of the N-channel MOSFET 13 is formed, and the delay eliminating circuit 17 is provided on the signal path.

In this preferred embodiment, components other than those relating to the delay eliminating circuit 17 are similar to circuit components of the DC-DC converter in FIG. 6, and in the description of the first preferred embodiment, portions which are identical to those in FIG. 6 are denoted by identical reference numerals, and a repeated description of the common portions is omitted.

The operation of the delay eliminating circuit 17, which is characteristic in the first preferred embodiment, is described below with the operations of an ON-timing delay circuit and the early turnoff circuit 16 by using the time chart in FIG. 2. For example, as part (c) of FIG. 2 shows, when a power switch driving circuit in the control IC 4 outputs an ON signal for turning on the power switch 3 at time t1, the ON signal causes a voltage to be applied to a series circuit of the primary coil 12A of the pulse transformer 12 and the gate (control terminal) of the power switch 3. Since the gate voltage of the power switch 3 is zero volts at the time of time t1, the voltage output from the power switch driving circuit is entirely applied to the primary coil 12A of the pulse transformer 12. This causes the second coil 12B of the pulse transformer 12 to output a pulse signal as shown in part (e) of FIG. 2.

Also, the ON signal output from the control IC 4 is supplied through the resistor 11 and the pulse transformer 12 to the gate of the power switch 3, and charge is added to the input capacitance of the power switch 3. The resistor 11 and the excitation inductance of the pulse transformer 12 operate as a delay factor, so that the power switch 3 has a gradual increase in gate voltage (see part (d) of FIG. 2). The increasing speed (charging speed of the input capacitance) of the gate voltage can be set by the resistance of the resistor 11 and the excitation inductance of the pulse transformer 12. In other words, the resistor 11 and the pulse transformer 12 constitute an ON-timing delay circuit for delaying ON timing of the power switch 3. The ON-timing delay circuit can be formed by only excitation inductance of the pulse transformer 12. The excitation inductance easily fluctuates by variations in components and a change in ambient environmental temperature. The fluctuation of the excitation inductance causes delay-operation termination timing of the ON-timing delay circuit to easily fluctuate. Therefore, the resistor 11 is provided in order to stabilize the delay-operation termination timing of the ON-timing delay circuit. In other words, the resistor 11 defines a delay adjusting circuit for adjusting the delay-operation termination timing of the ON-timing delay circuit.

In a period in which the ON timing of the power switch 3 is delayed by the delay operation of the ON-timing delay circuit, the pulse signal output from the secondary coil 12B is supplied as an ON signal to the gate (control terminal) of the N-channel MOSFET 13, thus turning on the N-channel MOSFET 13. The turn-on of the N-channel MOSFET 13 causes the charge stored in the gate of the commutating synchronous rectifier 6 to discharge at time t2, so that the commutating synchronous rectifier 6 is turned off.

When discharge of the charge stored in the gate of the commutating synchronous rectifier 6 steeply reduces the gate voltage of the commutating synchronous rectifier 6, a current flows into the capacitor 15 of the delay eliminating circuit 17 through the secondary coil 12B of the pulse transformer 12. This operation causes the primary coil 12A of the pulse transformer 12 to generate an electromotive force in a direction canceling the pulse signal in the pulse transformer 12. This eliminates the pulse signal. Accordingly, the delay effect of the pulse transformer 12 on the charging in the gate of the power switch 3 is eliminated and the gate of the power switch 3 is quickly charged. As shown in part (d) of FIG. 2, the gate voltage of the power switch 3 rapidly increases at time t4. In other words, the configuration in the first preferred embodiment, when the delay eliminating circuit 17 detects the turnoff of the commutating synchronous rectifier 6 by detecting a decrease in the gate voltage of the commutating synchronous rectifier 6 based on the flow of a current into the capacitor 15, the delay eliminating circuit 17 supplies the pulse transformer 12 with a signal representing the turnoff of the commutating synchronous rectifier 6, whereby the ON timing delay operation of the power switch 3 by the pulse transformer 12 and the resistor 11 (ON-timing delay circuit) is eliminated.

Also, after the pulse signal in the pulse transformer 12 disappears, a cyclic current flows in a path having a flowing order of the pulse transformer 12, the diode 10, and the pulse transformer 12, and a forward voltage drop in the diode 10 resets the magnetizing state of the pulse transformer 12. After that, as shown in part (c) of FIG. 2, the power switch driving circuit in the control IC 4 outputs an OFF signal for turning off the power switch 3 time t5, the charge stored in the input capacitance of the power switch 3 discharges through the diode 10, thus turning off the power switch 3.

As described above, in the first preferred embodiment, the early turnoff circuit 16 turns off the commutating synchronous rectifier 6 in a period in which the ON timing of the power switch 3 is delayed by the delay operation of the ON-timing delay circuit, whereby a short-circuiting current is prevented from being generated by a delay in the turnoff of the commutating synchronous rectifier 6. Also, as soon as the commutating synchronous rectifier 6 is turned off by the delay eliminating circuit 17, the delay operation of the ON-timing delay circuit is eliminated. Thus, a delay in the ON timing of the power switch 3 can be prevented from being excessive, and the generation of a switching loss caused by the excessive delay can be prevented.

A second preferred embodiment of the present invention is described below.

Figure 3:
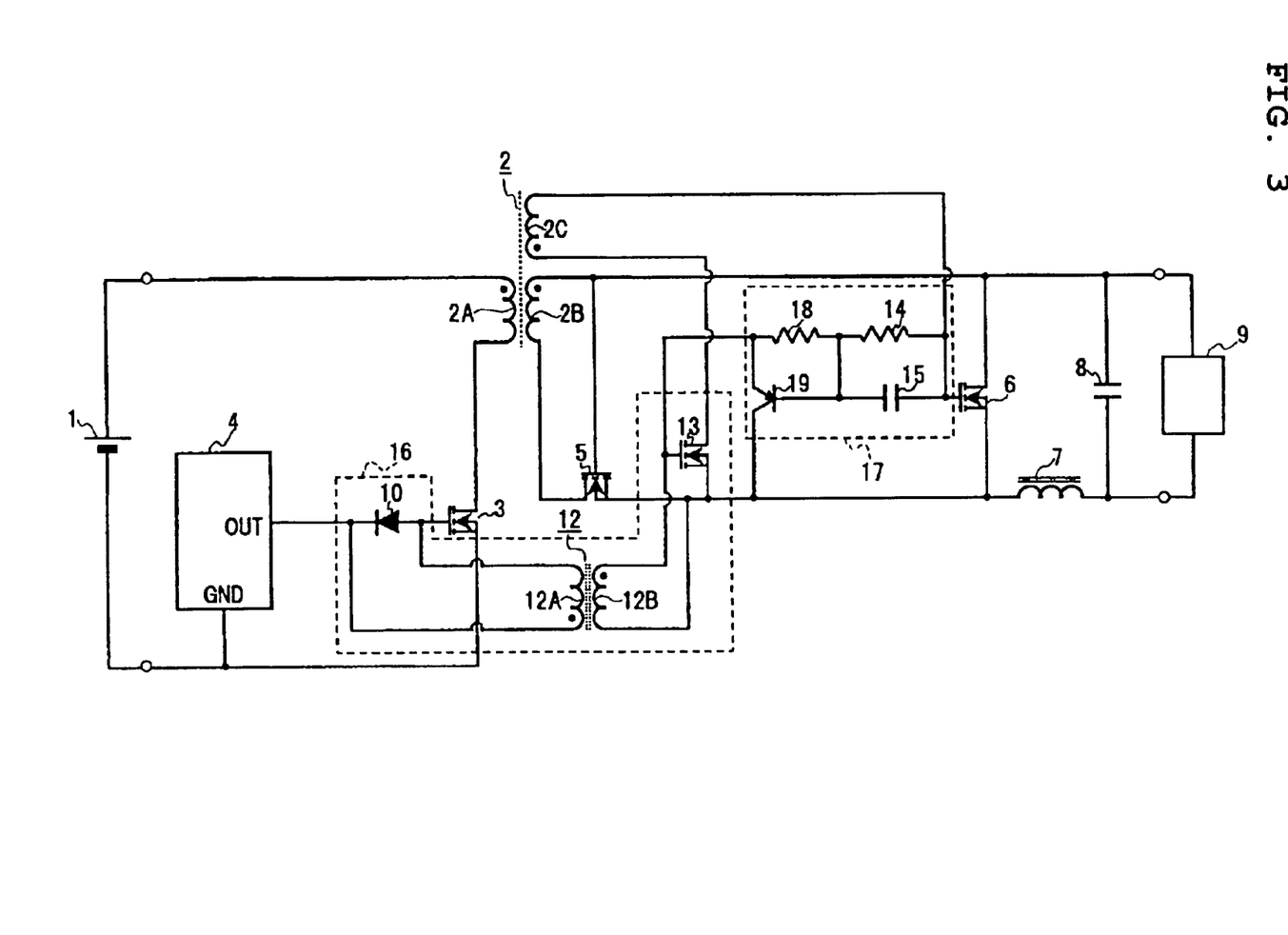
FIG. 3 is a circuit diagram showing a DC-DC converter according to another preferred embodiment of the present invention.

The circuit configuration of the second preferred embodiment is shown in FIG. 3. The second preferred embodiment differs from the first preferred embodiment in the circuit configuration of the early turnoff circuit 16 and the delay eliminating circuit 17, whereas other components are almost similar to those in the first preferred embodiment. In the description of the second preferred embodiment, a repeated description of circuit components other than the early turnoff circuit 16 and the delay eliminating circuit 17 is omitted.

In the second preferred embodiment, the early turnoff circuit 16 includes a diode 10, a pulse transformer 12, and an N-channel MOSFET 13. The pulse transformer 12 preferably includes a primary coil 12A and a secondary coil 12B. A delay eliminating circuit 17 includes resistors 14 and 18, a capacitor 14, and a PNP transistor 19.

An example of a circuit operation which is characteristic in the DC-DC converter in the second preferred embodiment is described below with reference to FIG. 2. By way of example, as shown in part (c) of FIG. 2, when the power switch driving circuit in the control IC 4 outputs an ON signal for turning on the power switch 3 at time t1, a voltage is applied to the primary coil 12A of the pulse transformer 12, and the secondary coil 12B outputs a pulse signal as shown in part (e) of FIG. 2.

The ON signal output from the control IC 4 is supplied to the gate of the power switch 3 through the pulse transformer 12, and adds charge to the input capacitance of the power switch 3. The excitation inductance of the pulse transformer 12 in the ON-timing delay circuit slows the charging speed, and the ON timing of the power switch 3 is delayed. In the second embodiment, the resistors 14 and 18 function as a delay adjusting circuit for adjusting delay-operation-terminating timing of the ON-timing delay circuit.

During the delay of the ON timing of the power switch 3, the pulse signal output from the secondary coil 12B is supplied to the control terminal (gate) of the N-channel MOSFET 13, and the N-channel MOSFET 13 is turned on. After the N-channel MOSFET 13 is turned on, as shown in part (f) of FIG. 2, at time t2, the charge stored in the gate of the commutating synchronous rectifier 6 discharges and the commutating synchronous rectifier 6 is turned off.

A voltage, obtained by dividing a voltage difference between the gate of the commutating synchronous rectifier 6 and the gate of the N-channel MOSFET 13 by the resistors 14 and 18, is applied across the base and emitter of the PNP transistor 19. When the gate voltage of the commutating synchronous rectifier 6 is lower than the gate voltage of the N-channel MOSFET 13 by turnoff of the commutating synchronous rectifier 6 by the early turnoff circuit 16, and the base-emitter voltage of the PNP transistor 19 is greater than a threshold value, the PNP transistor 19 in the delay eliminating circuit 17 is turned on. When the PNP transistor 19 is turned on, the ends of the secondary coil 12B in the pulse transformer 12 are short-circuited. This eliminates the delay effect by the exciting inductance of the pulse transformer 12, and the gate of the power switch 3 is promptly charged.

After the pulse signal in the pulse transformer 12 disappears, a cyclic current flows in a path having a flowing order of the pulse transformer 12, the diode 10, and the pulse transformer 12, and a drop in forward current of the diode 10 resets the exciting state of the pulse transformer 12. When the power switch driving circuit in the control IC 4 outputs the OFF signal for turning off the power switch 3 at time t5 (see part (c) of FIG. 2), the charge stored in the input capacitance of the power switch 3 discharges, and the power switch 3 is turned off.

Also in the second preferred embodiment, similarly to first preferred embodiment, the early turnoff circuit 16 turns off the commutating synchronous rectifier 6 in a period in which the ON timing of the power switch 3 is delayed by the delay operation of the ON-timing delay circuit, whereby a short-circuiting current is prevented from being generated by a delay in turnoff of the commutating synchronous rectifier 6. In addition, since the delay eliminating operation of the delay eliminating circuit 17 eliminates the delay operation of the ON-timing delay circuit as soon as the commutating synchronous rectifier 6 is turned off, a delay in ON timing of the power switch 3 can be prevented from being excessive, and a switching loss caused by the excessive delay can be prevented.

A third preferred embodiment of the present invention is described below.

Figure 4:
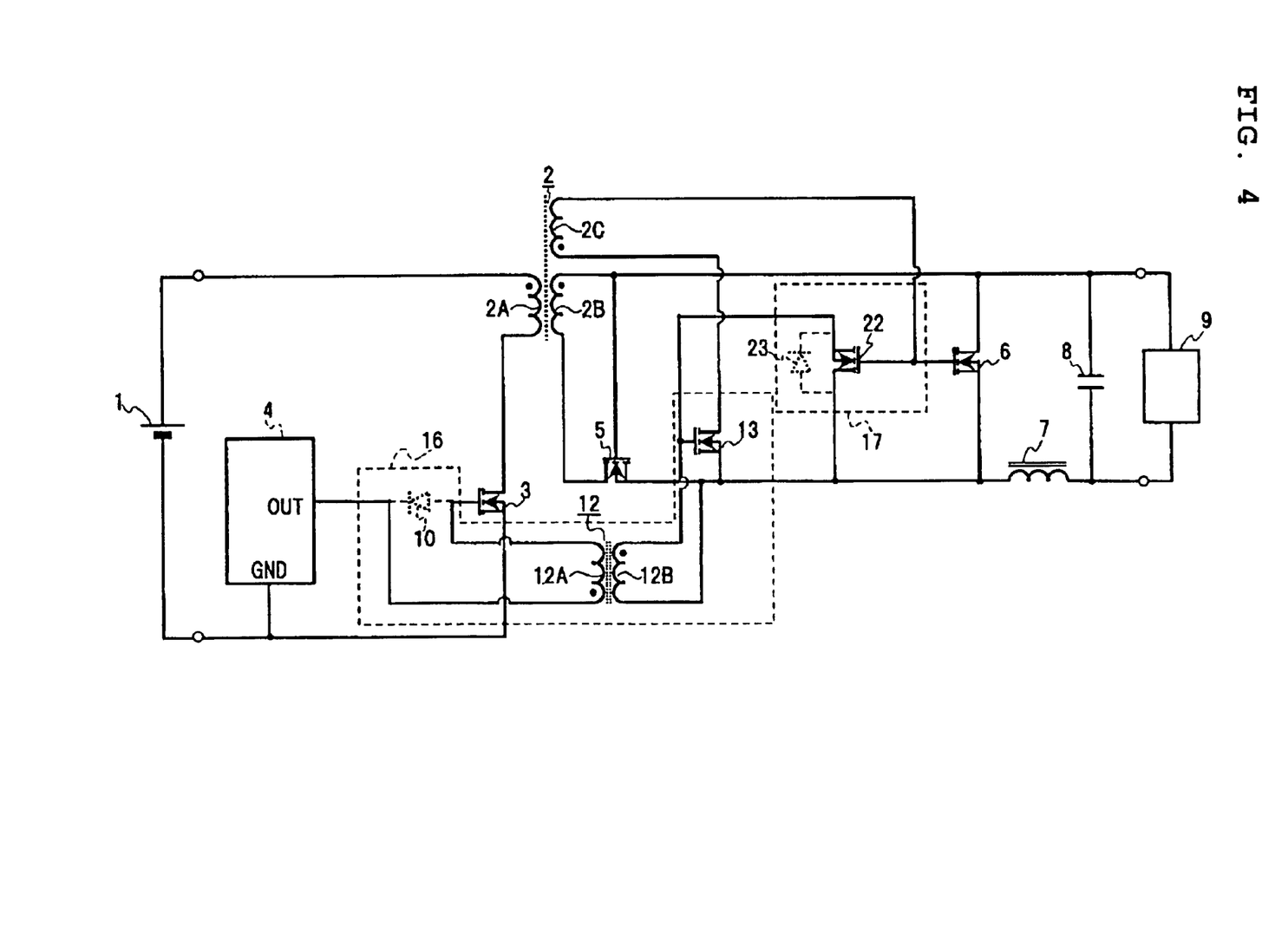
FIG. 4 is a circuit diagram showing a DC-DC converter according to another preferred embodiment of the present invention.

The circuit configuration of the third preferred embodiment is shown in FIG. 4. The third preferred embodiment has components similar to those of the first and second preferred embodiments, excluding the circuit configuration of an early turnoff circuit 16 and a delay eliminating circuit 17. In the third preferred embodiment, components which are identical to those in the first and second preferred embodiments are denoted by identical reference numerals, and a repeated description of each component is omitted.

In the third preferred embodiment, the early turnoff circuit 16 includes a pulse transformer 12 and an N-channel MOSFET 13. The pulse transformer 12 includes a primary coil 12A and a secondary coil 12B. The delay eliminating circuit 17 includes a P-channel MOSFET 22.

Examples of circuit operations of the early turnoff circuit 16 and the delay eliminating circuit 17 in the third preferred embodiment are described with reference to FIG. 2. For example, as shown in part (c) of FIG. 2, when the power switch driving circuit in the control IC 4 outputs an ON signal for turning on the power switch 3, a voltage is applied to the primary coil 12A of the pulse transformer 12, and the secondary coil 12B outputs a pulse signal as shown in part (e) of FIG. 2.

The ON signal output from the control IC 4 is supplied to the gate of the power switch 3, and adds charge to the input capacitance of the power switch 3. The excitation inductance of the pulse transformer 12 in the ON-timing delay circuit slows the charging speed, and the ON timing of the power switch 3 is delayed.

During the delay of ON timing of the power switch 3, the pulse signal output from the secondary coil 12B is supplied to the gate of the N-channel MOSFET 13 and turns on the N-channel MOSFET 13. When the N-channel MOSFET 13 is turned on, as shown in part (f) of FIG. 2, the charge stored in the gate of the commutating synchronous rectifier 6 discharges and the commutating synchronous rectifier 6 is turned off.

When a drop in the gate voltage of the commutating synchronous rectifier 6, which is caused by discharge of the charge stored in the gate of the commutating synchronous rectifier 6, increases the source-gate voltage (i.e., a difference in gate voltage between the commutating synchronous rectifier 6 and the N-channel MOSFET 13) of the P-channel MOSFET 22, and the source-gate voltage of the P-channel MOSFET 22 reaches a threshold value, the P-channel MOSFET 22 is turned on, and the ends of the secondary coil 12B of the pulse transformer 12 are short-circuited. This eliminates the pulse signal output from the pulse transformer 12, whereby the delay effect by the excitation inductance of the pulse transformer 12 in the ON-timing delay circuit is eliminated. This elimination of the delay operation of the ON-timing delay circuit promptly charges the gate of the power switch 3.

After the pulse signal in the pulse transformer 12 disappears, a cyclic current flows in a path having flowing order of the pulse transformer 12, and the parasitic diode 23 of the P-channel MOSFET 22, and the pulse transformer 12, and a drop in forward current in the parasitic diode 23 resets the exciting state of the pulse transformer 12. As described above, the parasitic diode 23 of the P-channel MOSFET 22 can reset the pulse transformer 12 similarly to the diodes 10 in the first and second preferred embodiments. Accordingly, in the third preferred embodiment, each diode 10 shown in the first and second preferred embodiments is omitted and the number of components is reduced.

After that, when the power switch driving circuit in the control IC 4 outputs an OFF signal for turning off the power switch 3 (see part (c) of FIG. 2), the charge stored in the input capacitance of the power switch 3 discharges and the power switch 3 is turned off.

Also in the third preferred embodiment, similarly to first and second preferred embodiments, the early turnoff circuit 16 turns off the commutating synchronous rectifier 6 in a period in which the ON timing of the power switch 3 is delayed by the delay operation of the ON-timing delay circuit, whereby a short-circuiting current is prevented from being generated by a delay in turnoff of the commutating synchronous rectifier 6. Also, the delay eliminating operation of the delay eliminating circuit 17 eliminates the delay operation of the ON-timing delay circuit as soon as the commutating synchronous rectifier 6 is turned off. Thus, a delay in ON timing of the power switch 3 can be prevented from being excessive, and the generation of a switching loss caused by the excessive delay can be prevented.

The present invention is not limited to the configurations of the first, second and third preferred embodiments, but may have various other embodiments, structures and configurations. Although, in the first to third preferred embodiments, for example, the DC-DC converters are of a forward type, the present invention may be applied to power converting methods other than the forward type, for example, a flyback type, a push-pull type having a plurality of power switches, a half bridge type, etc.

Although, in the first preferred embodiment, the resistor 11 is provided as a delay adjusting circuit in parallel to the primary coil 12A in the pulse transformer 12, for example, the resistor 11 may be omitted. In the case of omitting the resistor 11, the excitation inductance of the primary coil 12A is set so that it is ensured that the ON timing of the power switch 3 is delayed until the commutating synchronous rectifier 6 is turned on by the early turnoff circuit 16. In this case, the delay operation period of the ON-timing delay circuit is set to be long. However, in the configuration of various preferred embodiments of the present invention, the delay eliminating circuit 17 is provided, and the delay eliminating circuit 17 eliminates the delay operation of the ON-timing delay circuit as soon as the commutating synchronous rectifier 6 is turned off. Thus, as in the related art, even if the commutating synchronous rectifier 6 is turned off, a switching loss, caused by continuous implementation of the delay operation by the ON-timing delay circuit, can be prevented from increasing.

Although, in the first and second preferred embodiments, the diode 10 is provided on a signal path connecting the output terminal OUT of the control IC 4 and the gate of the power switch 3, the diode 10 may be omitted. In the case of omitting the diode 10, when the ends of the secondary coil 12B of the pulse transformer 12 are short-circuited by the delay eliminating circuit 17, an inverse voltage is generated in the primary coil 12A, and is applied as an ON inducing signal to the gate of the power switch 3. Therefore, when the delay operation of the ON-timing delay circuit is eliminated by the delay eliminating circuit 17, not only charge is promptly supplied from the control IC 4 to the gate of the power switch 3, but also charge is also supplied from the primary coil 12A of the pulse transformer 12, whereby the gate of the power switch 3 is charged very fast. In other words, when the diode 10 is omitted, the primary coil 12A of the pulse transformer 12 forms a power-switch-ON-inducing circuit for inducing the turn-on operation of the power switch 3.

Figure 5:
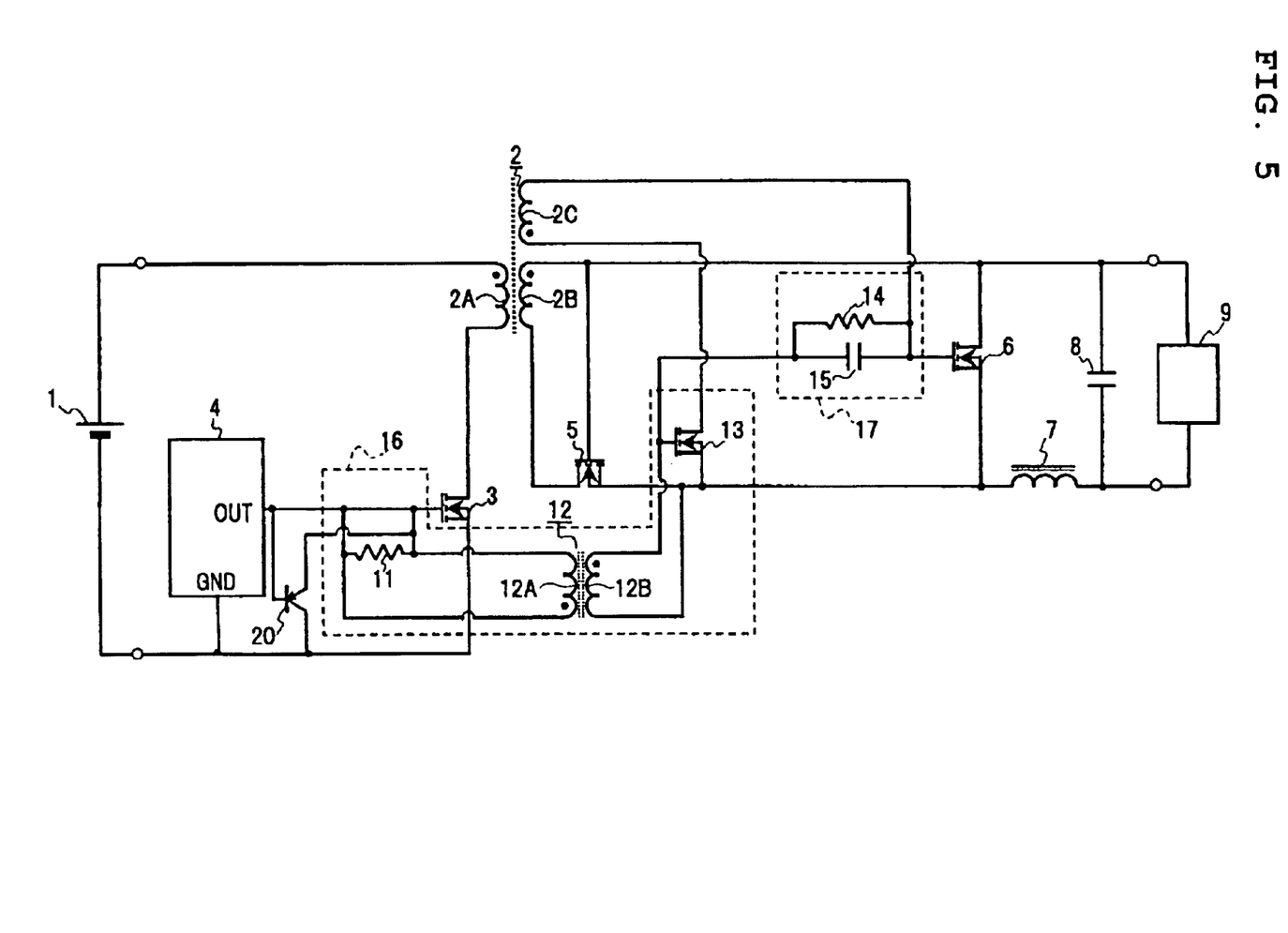
FIG. 5 is a circuit diagram showing another preferred embodiment of the present invention.

Also, the diode 10 has a function of inducing discharging of the input capacitance of the power switch 3 when the power switch 3 is turned off. Thus, when the diode 10 is omitted, for example, a PNP transistor 20 as shown in FIG. 5 has a function similar to that of the diode 10.

In the second preferred embodiment, the delay eliminating circuit 17 is provided with a combination of the resistors 14 and 18 connected to each other in series. A voltage difference between the gate of the commutating synchronous rectifier 6 and the gate of the N-channel MOSFET 13 is divided by the resistors 14 and 18, and the divided voltage is applied to the base of the PNP transistor 19. When, for example, the voltage difference between the gate of the commutating synchronous rectifier 6 and the gate of the N-channel MOSFET 13 is slightly less than a voltage (threshold value) for turning on the PNP transistor 19, the voltage difference between the gate of the commutating synchronous rectifier 6 and the gate of the N-channel MOSFET 13 can be applied to the gate of the PNP transistor 19 without being divided, and with regard for withstand voltage. In this case, for example, the resistor 18 can be omitted.

In addition to the configuration of the third preferred embodiment, similarly to the first and second preferred embodiments, a signal path that directly connects the output terminal OUT of the control IC 4 and the gate of the power switch 3, as indicated by the dashed line, may be provided, and the diode 10 may be provided on the signal path. In this case, after the delay eliminating circuit 17 eliminates the pulse signal output from the pulse transformer 12, a drop in forward voltage of two diodes composed of the parasitic diode 23 of the P-channel MOSFET 22 and the diode 10 resets the exciting state of the pulse transformer 12.

In addition to the components in the second and third preferred embodiments, similarly to the first preferred embodiment, a resistor 11 may be provided in parallel to the primary coil 12A of the pulse transformer 12.

In the first, second and third preferred embodiments, the ON-timing delay circuit uses the excitation inductance of the primary coil 12A of the pulse transformer 12. By way of example, an inductor, a current transformer, or a switching element may be provided as the ON-timing delay circuit in parallel to a current loop in which an AC current flows and which is constituted by the secondary coil 2B of the main transformer 2, the rectifying synchronous rectifier 5, and the commutating synchronous rectifier 6. In this case, a delay eliminating circuit in accordance with the ON-timing delay circuit needs to be provided.

In the first to third preferred embodiments, the pulse transformer 12 is preferably used to transmit, from the primary side to secondary side of the main transformer 2, a signal representing the output of the ON signal from the control IC 4 to the power switch 3. However, for example, by using a photocoupler, a configuration in which the signal representing the output of the ON signal from the control IC 4 to the power switch 3 is transmitted from the primary side to secondary side of the main transformer 2 may be used.

Moreover, the main transformer 2 and the pulse transformer 12 may be formed as magnetically separate transformers, with a set of cores being used, by using the method disclosed in Japanese Unexamined Patent Application Publication No. 2000-260639. This formation reduces the number of components, thus realizing cost reduction.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A DC-DC converter comprising:
    a transformer having a primary side and a secondary side;
    at least one power switch provided on the primary side of said transformer, a switching operation of said at least one power switch causing the secondary side of said transformer to output AC power;
    a rectifying-and-smoothing circuit connected to the secondary side of said transformer and converting the output AC power into DC power, said rectifying-and-smoothing circuit including an inversely driven synchronous rectifier including a MOSFET having an ON/OFF switching operation that is inverse with respect to that of said at least one power switch;
    a power switch driving circuit for alternately outputting an ON signal and an OFF signal to said at least one power switch in order to control the switching operation of said at least one power switch;
    an ON-timing delay circuit for detecting output of the ON signal from said power switch driving circuit to said at least one power switch and delaying ON timing of said at least one power switch by hindering the start of an ON operation of said at least one power switch based on the ON signal;
    an early turnoff circuit for turning off the inversely driven synchronous rectifier by outputting an OFF signal to said inversely driven synchronous rectifier upon detecting output of the ON signal from said power switch driving circuit to said at least one power switch, in a period in which the start of the ON operation of said at least one power switch is delayed by said ON-timing delay circuit; and
    a delay eliminating circuit for eliminating a delay operation of said ON-timing delay circuit when detecting turnoff of the inversely driven synchronous rectifier by detecting a decrease in the gate voltage of the inversely driven synchronous rectifier.

2. A DC-DC converter according to claim 1, wherein said ON-timing delay circuit is provided on a signal path extending to said at least one power switch from said power switch driving circuit.

3. A DC-DC converter according to claim 1, wherein said DC-DC converter is a forward converter, and the inversely driven synchronous rectifier is a commutating synchronous rectifier.

4. A DC-DC converter according to claim 1, wherein said early turnoff circuit includes a pulse transformer in which a signal representing the output of the ON signal from said power switch driving circuit to said at least one power switch is converted into a pulse signal and which turns off the inversely driven synchronous rectifier by transmitting the pulse signal from the primary side to secondary side of said transformer.

5. A DC-DC converter according to claim 4, wherein said ON-timing delay circuit is configured to delay the ON timing of said at least one power switch by using excitation inductance of the pulse transformer in said early turnoff circuit, and said delay eliminating circuit is configured to eliminate the delay operation of said ON-timing delay circuit, which is caused by the excitation inductance of said transformer, by supplying the pulse transformer with a signal representing turnoff of the inversely driven synchronous rectifier.

6. A DC-DC converter according to claim 1, further comprising a power-switch-ON-inducement circuit which expedites a turn-on operation of said at least one power switch by outputting an ON inducement signal to said at least one power switch when the delay operation of said ON-timing delay circuit is eliminated by said delay eliminating circuit.

7. A DC-DC converter according to claim 1, wherein said ON-timing delay circuit includes a delay adjusting circuit for adjusting delay-operation termination timing.

8. A DC-DC converter according to claim 1, wherein the at least one power switch is an N-channel MOSFET.

9. A DC-DC converter according to claim 1, wherein the delay eliminating circuit includes a resistor and a capacitor.

10. A DC-DC converter according to claim 3, wherein the early turnoff circuit turns off the commutating synchronous rectifier in a period in which the ON timing of the at least one power switch is delayed by the delay operation of the ON-timing delay circuit, whereby a short-circuiting current is prevented from being generated by a delay in the turnoff of the commutating synchronous rectifier.

11. A DC-DC converter according to claim 10, wherein as soon as the commutating synchronous rectifier is turned off by the delay eliminating circuit, the delay operation of the ON-timing delay circuit is eliminated.

12. A DC-DC converter according to claim 1, wherein the early turnoff circuit includes a diode, a pulse transformer, and an N-channel MOSFET.

13. A DC-DC converter according to claim 1, wherein the transformer is a pulse transformer that includes a primary coil and a secondary coil.

14. A DC-DC converter according to claim 1, wherein the delay eliminating circuit includes resistors, a capacitor, and a PNP transistor.

15. A DC-DC converter according to claim 1, further comprising a delay adjusting circuit including at least one resistor.

16. A DC-DC converter according to claim 1, wherein the early turnoff circuit includes a pulse transformer and an N-channel MOSFET.

17. A DC-DC converter according to claim 16, wherein the pulse transformer includes a primary coil and a secondary coil.

18. A DC-DC converter according to claim 1, wherein the delay eliminating circuit includes a P-channel MOSFET.

19. A DC-DC converter according to claim 1, wherein the DC-DC converter is one of a forward type, a flyback type, a push-pull type having a plurality of power switches, and a half bridge type.

* * * * *